United States Patent
Iania

(10) Patent No.: US 8,408,346 B2
(45) Date of Patent: Apr. 2, 2013

(54) MOTOR VEHICLE FRONT END

(75) Inventor: Rosario Iania, Turin (IT)

(73) Assignee: Fiat Group Automobiles S.p.A., Turin (IT)

(*) Notice: Subject to any disclaimer, the term of this patent is extended or adjusted under 35 U.S.C. 154(b) by 0 days.

(21) Appl. No.: 13/444,255

(22) Filed: Apr. 11, 2012

(65) Prior Publication Data

US 2012/0261205 A1  Oct. 18, 2012

(30) Foreign Application Priority Data

Apr. 12, 2011 (EP) ..................... 11425101

(51) Int. Cl.
*B60K 11/04* (2006.01)

(52) U.S. Cl. ............... 180/68.4; 180/311; 296/203.01; 165/67

(58) Field of Classification Search .......... 180/68.4, 180/311; 296/194, 196, 197, 203.01; 165/67
See application file for complete search history.

(56) References Cited

U.S. PATENT DOCUMENTS

| | | | |
|---|---|---|---|
| 6,681,876 B1 * | 1/2004 | Haneda et al. | 180/68.4 |
| 6,729,424 B2 * | 5/2004 | Joutaki et al. | 180/68.4 |
| 8,220,576 B2 * | 7/2012 | Terada et al. | 180/68.4 |
| 2004/0188155 A1 | 9/2004 | Fujieda | |
| 2004/0211607 A1 * | 10/2004 | Sasano et al. | 180/68.4 |
| 2006/0213640 A1 * | 9/2006 | Matsuoka et al. | 165/67 |
| 2007/0068716 A1 * | 3/2007 | Kunikata | 180/68.4 |
| 2007/0144713 A1 * | 6/2007 | Sugimoto et al. | 165/140 |
| 2011/0011661 A1 * | 1/2011 | Takahashi et al. | 180/68.4 |

FOREIGN PATENT DOCUMENTS

| | | |
|---|---|---|
| EP | 1 106 413 A2 | 6/2001 |
| EP | 2 295 296 A2 | 3/2011 |

* cited by examiner

*Primary Examiner* — Toan To
(74) *Attorney, Agent, or Firm* — Dickstein Shapiro LLP

(57) ABSTRACT

A motor vehicle front end has a frame, which supports a heat exchanger and has an upper horizontal crosspiece connected to two uprights by means of connection elements, which are plastically deformable so as to allow the upper horizontal crosspiece to be lowered in the event of an accident; the upper horizontal crosspiece comprises a rigid rear portion and a plastically deformable, front portion which is made of plastic material and is fixed to the rigid rear portion.

9 Claims, 3 Drawing Sheets

MOTOR VEHICLE FRONT END

The present invention relates to a motor vehicle front end.

BACKGROUND OF THE INVENTION

As known, in motor vehicles, the radiator is arranged in a front area of the engine compartment and is supported by a metal frame comprising an upper horizontal crosspiece, to which the bonnet is releasably coupled in order to close the engine compartment from above.

In the event of a frontal collision with pedestrian, the pedestrian's pelvis is struck by a front part of the bonnet, the deformation of which is limited by the presence of the aforementioned crosspiece underneath.

In order to absorb the impact and minimize injury to the pedestrian, safety systems introduced in the engine compartment are known. With regard to the safety of the area of the pedestrian's pelvis, active safety systems are normally used, such as air bags or actuators to move the bonnet or other members of the engine compartment, which are activated by an electronic control unit in response to signals emitted from suitable sensors.

However, in order to minimize costs, number components and weight of the motor vehicle, the need is felt to use passive safety systems, i.e. systems which may collapse when impacting, but which are equally effective.

The US patent application published with number U.S.2004/0188155A1 corresponds to the preamble of claim 1 and discloses a passive safety system, in which the radiator is supported from above by a crosspiece which may move backwards in the event of an accident, due to two plastically deformable, lateral portions which define a virtual hinge. The backward movement of the crosspiece allows to have more space available for the deformation of the bonnet. The need is felt to enhance this solution in order to obtain greater absorption of impact energy when colliding with a pedestrian.

SUMMARY OF THE INVENTION

The object of the present invention is to provide a motor vehicle front end, which allows the above-mentioned requirement to be fulfilled in a simple and cost-effective manner.

According to the present invention, a motor vehicle front end is provided as defined in claim 1.

BRIEF DESCRIPTION OF THE DRAWINGS

For a better understanding of the present invention, a preferred embodiment thereof will now be described, by way of non-limiting example, with reference to the accompanying drawings, in which.

DETAILED DESCRIPTION OF THE INVENTION

Figure 1:
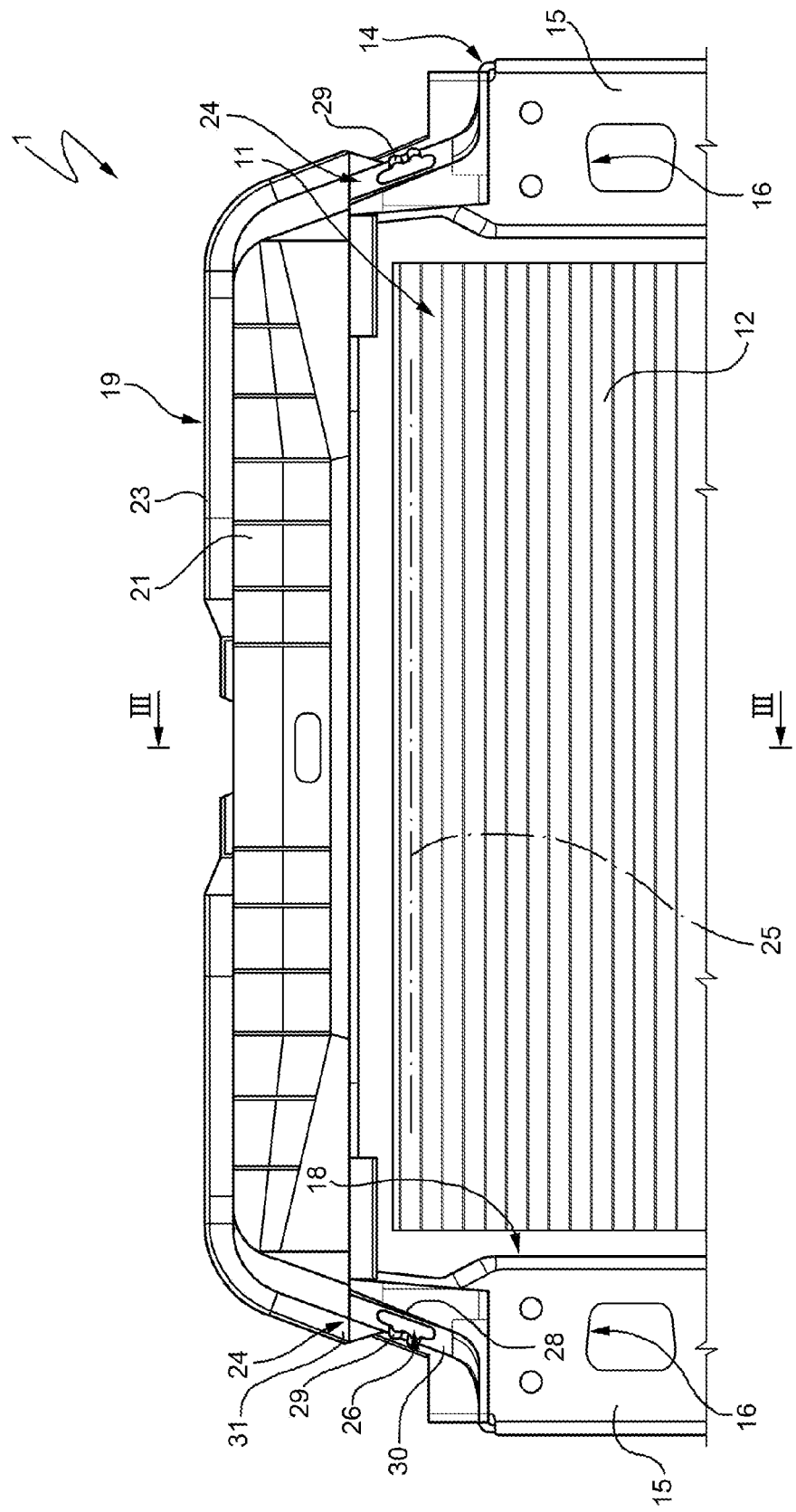
FIG. 1 is a frontal view which partially shows a preferred embodiment of the motor vehicle front end according to the present invention.
Figure 3:
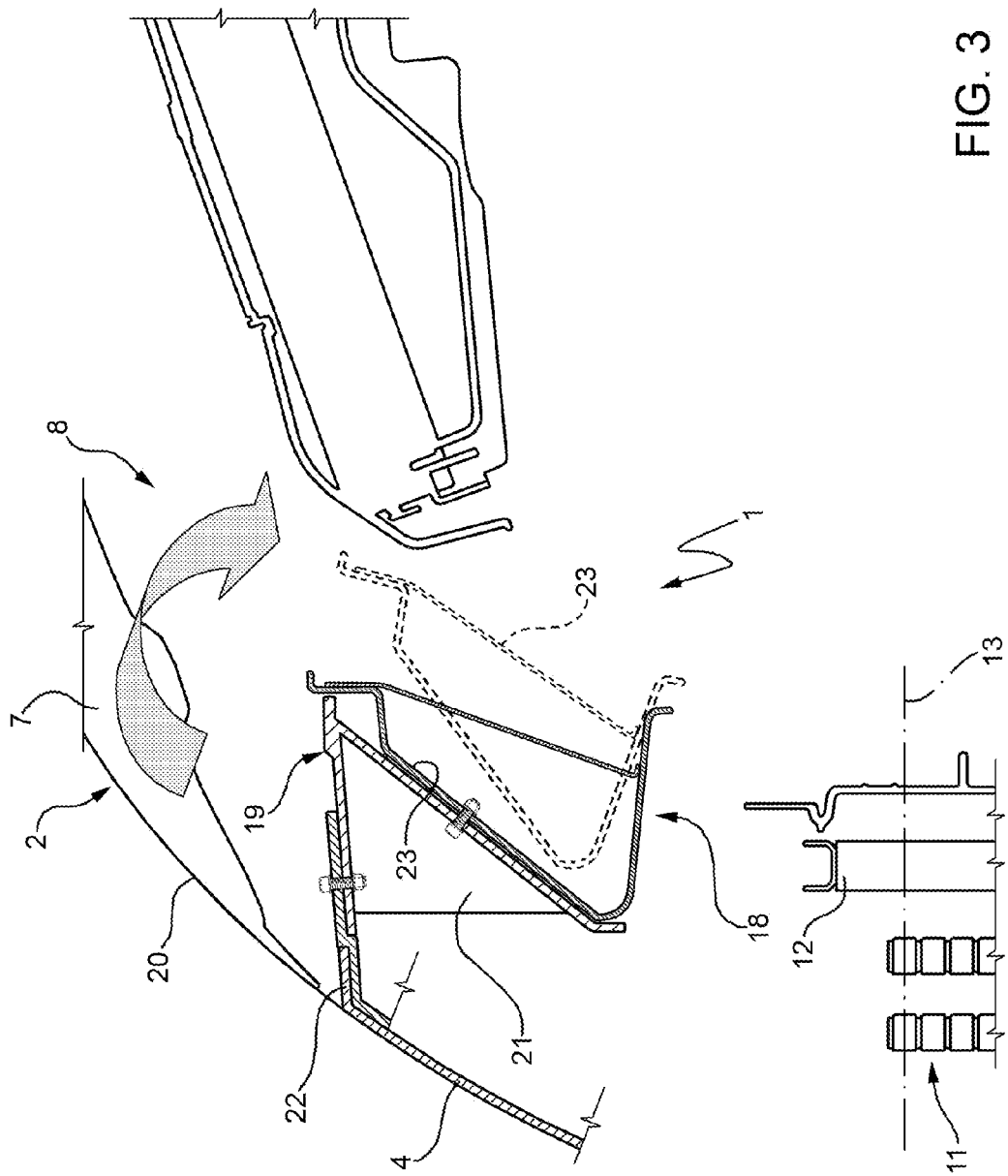
FIG. 3 is a section according to line of FIG. 1 and shows a plastic deformation of a portion of the motor vehicle front end in a schematic and simplified manner.

In FIGS. 1 and 3, numeral 1 indicates, as a whole, a front end (partially shown) of a motor vehicle 2. The front end 1 is arranged in an engine compartment 3, which is frontally delimited by a bumper 4 (partially shown) at the front and by a bonnet 7 (partially shown) from above. Bonnet 7 is hinged at a rear end thereof (not shown) so as to rotate between a lowered position, in which it closes the engine compartment 3, and a raised position, in which access to engine compartment 3 is permitted.

With reference again to FIG. 1, front end 1 comprises a heat exchanger unit 11 (partially shown), which in turn comprises at least one radiator 12 arranged orthogonal to a longitudinal axis 13 coinciding with the forward axis of motor vehicle 2. Front end 1 further comprises a support structure defined by a frame 14 (partially shown), in turn comprising two lateral uprights 15, which are normally referred to as "vertical links" and are fixed to the front ends of two longitudinal struts 17 (one of which is schematically shown by a dotted line in FIG. 2). Uprights 15 define respective vertical plates, which are longitudinally aligned with the respective struts 17 and have respective holes 16 to be coupled to the struts 17 themselves. At their rear ends, the struts 17 are in turn fixed (in a not shown manner) to the body shell of motor vehicle 2, and may have collapsible areas to absorb impacts which occur at a relatively high speed.

Frame 14 supports unit 11 in a known manner, which is not described in detail, and delimits a substantially rectangular opening 18, which is coaxial with axis 13 and at least partially houses unit 11.

Figure 2:
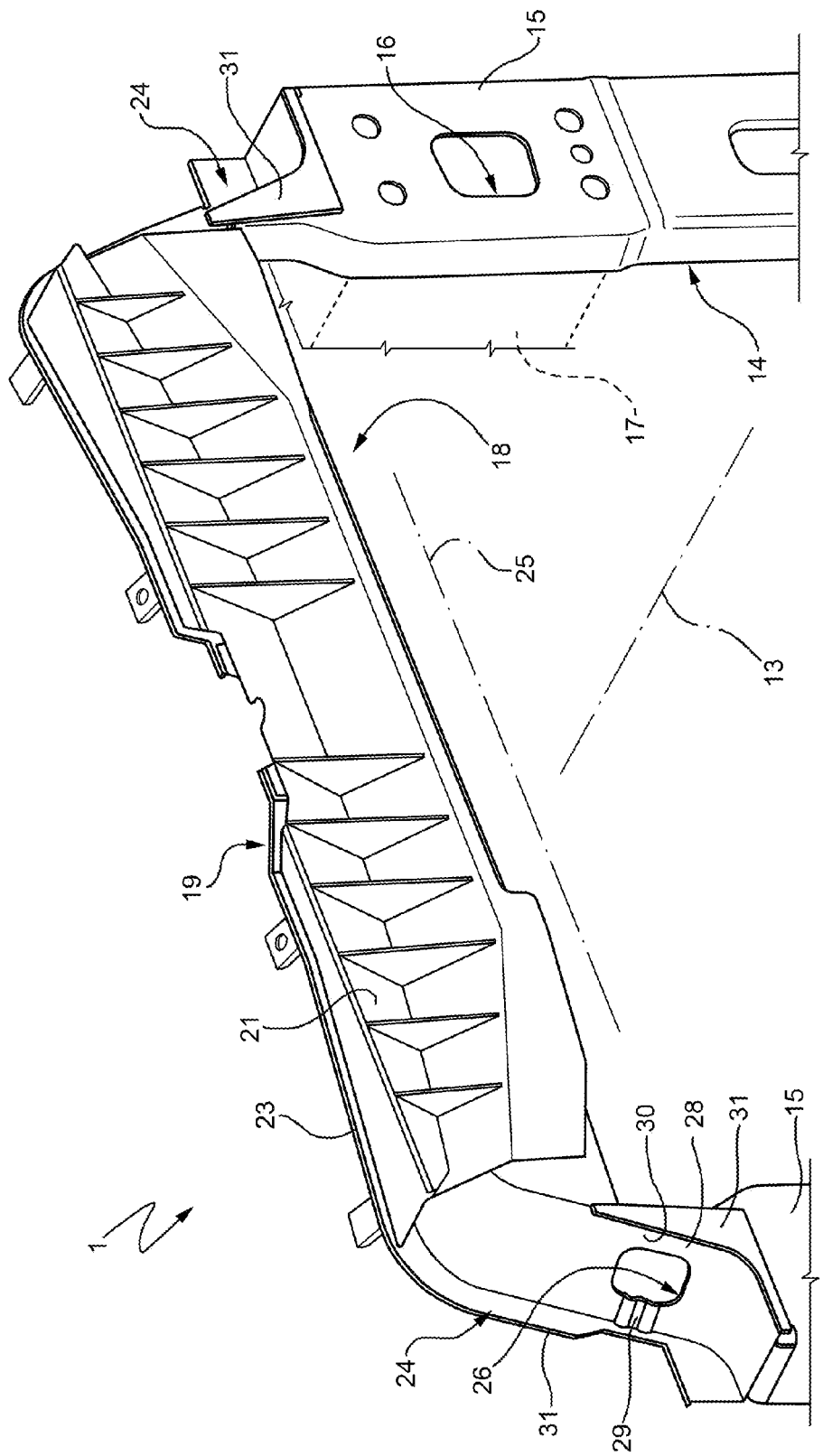
FIG. 2 is a partial perspective view of the front end in FIG. 1.

With reference to FIGS. 2 and 3, frame 14 comprises a lower horizontal crosspiece (not shown) and an upper overall crosspiece 19, which is horizontal and is arranged beneath a front end portion 20 of bonnet 7. Crosspiece 19 comprises a front portion 21, which is collapsible in order to absorb energy and supports an upper end portion 22 of bumper 4; and a rear portion 23, which is relatively rigid as compared to portion 21, and is coupled (in a not shown manner) to portion 20 by means of a lock to releasably hold bonnet 7 in the lowered position. In other words, portion 21 has a much greater impact absorbing capacity than portion 23.

Portion 23 is preferably made of metal material, and portion 21 is defined by an additional body made of plastic material. Said additional body frontally covers portion 23, is fixed to portion 23, e.g. by means of screws, and substantially extends over the whole length of portion 23. As an alternative to screw fixing, portion 21 could be over-moulded onto portion 23.

Frame 14 further comprises two connection elements 24, which connect the upper ends of uprights 15 to the lateral ends of portion 23. In particular, elements 24 are made of metal, define collapsible nodes at the lateral ends of crosspiece 19, are preferably made as a single piece with portion 23, and are fixed by welding to uprights 15. Elements 24 are plastically deformable or collapsible in the event of impact, particularly in the event of an impact between portions 20 and/or 22 and a pedestrian (not shown), so as to allow crosspiece 19 to be lowered. With reference to FIG. 3, elements 24 are shaped so as to define a virtual hinge axis 25, which is orthogonal to axis 13, is arranged beneath crosspiece 19, and allows the crosspiece 19 to rotate backwards when the elements 24 deform due to an impact on portions 20 or 22. At the same time, elements 24 have such geometry, material and dimensions to be able to support, without plastic deformations, the normal loads which occur in use, in particular the vertical bias on portion 23 given by closing the bonnet 7 on rubber buffers and the pull of the lock.

Elements 24 are arranged beneath the lateral ends of portion 23 and have respective passages 26, which are obtained parallel to axis 25 and are defined by a closed edge. Elements 24 comprise respective areas 28, which frontally delimit the passages 26, and respective areas 29 which delimit the passages 26 at the back, and have less vertical compression strength than areas 28, whereby they tend to be vertically crushed more than areas 28 when front portion 20 is subjected to the aforementioned impact and pushes the crosspiece 19 downwards. Such a configuration allows crosspiece 19 to rotate about axis 25.

Furthermore, the compression strength of portion 21 is less than that of areas 29, whereby during an impact, portion 21 collapses before areas 29, so as to obtain a progressive deformation of front end 1.

On each side of crosspiece 19, the areas 28 and 29 form part of a flat plate 30, which is substantially vertical and substantially longitudinal. In fact, plates 30 have a slight upward and forward convergence (FIG. 1).

Elements 24 further comprise respective vertical walls 31, which are transversal to plates 30 so as to locally reinforce them and are absent or made with reduced dimensions at areas 29.

FIG. 3 schematically shows the rotation of portion 23 of crosspiece 19 about axis 25 with respect to an undeformed condition, in the event of collision with a pedestrian. While rotating, crosspiece 19 is lowered and therefore creates a useful space to allow front portion 20 of bonnet 7 to deform and therefore absorb impact energy. At the same time, the impact energy is also absorbed by the deformation of portion 21 of crosspiece 19.

The energy absorption of portion 21 is obviously added to that of bonnet 7 and areas 29, whereby it contributes to reducing injury to the pedestrian in the pelvis area, i.e. the area of the body which normally collides against portions 20 and 22 in the event of an accident. Moreover, the plastic deformation of portion 21 generates even more free space for the deformation and lowering of portion 20 of bonnet 7.

Therefore, it is apparent that the front end 1 has features such as to minimize injury to pedestrians in the event of an accident, using a passive safety system, i.e. without actuators, but which takes highly effective advantage of the deformable or collapsible portions of frame 14.

Furthermore, frame 14 is relatively simple to be manufactured, and in known motor vehicles, it requires minor modifications to the other components in order to be introduced in place of the previously used support structures.

Finally, from the above, it is apparent that modifications and variations may be made to the described and illustrated front end 1, which do not depart from the scope of protection of the present invention, as defined in the appended claims.

In particular, the plastic yielding of portion 23 of crosspiece 19 could be defined by means of connection elements having a different shape and structure than that of elements 24. Moreover, the shape of portion 21 could also be different from that shown by way of example in FIG. 2.

The invention claimed is:

1. A motor vehicle front end comprising a heat exchanger unit and a frame, which supports said heat exchanger unit and comprises:
   two uprights fixed, in use, to respective struts of the motor vehicle;
   an upper horizontal crosspiece; and
   two connection elements, which connect said uprights to lateral ends of said upper horizontal crosspiece and are plastically deformable so as to allow said upper horizontal crosspiece to be lowered in the event of collision with a pedestrian;
   wherein said upper horizontal crosspiece comprises:
   a rear portion, which is relatively rigid and is fixed, at the lateral ends thereof, to said connection elements; and
   a front portion, which is plastically deformable, covers said rear portion and supports, in use, a bumper of the motor vehicle, and
   wherein said frame defines a substantially rectangular opening that houses at least part of the heat exchanger unit and the front portion is fixed to the rear portion.

2. A motor vehicle front end comprising a heat exchanger unit and a frame, which supports said heat exchanger unit and comprises:
   two uprights fixed, in use, to respective struts of the motor vehicle;
   an upper horizontal crosspiece; and
   two connection elements, which connect said uprights to lateral ends of said upper horizontal crosspiece and are plastically deformable so as to allow said upper horizontal crosspiece to be lowered in the event of collision with a pedestrian;
   wherein said upper horizontal crosspiece comprises:
   a rear portion, which is relatively rigid and is fixed, at the lateral ends thereof, to said connection elements; and
   a front portion, which is plastically deformable, covers said rear portion and supports, in use, a bumper of the motor vehicle, and
   wherein said front portion has a compression strength lower than that of said connection elements, so as to plastically deform before said connection elements in the event of an accident.

3. A motor vehicle front end comprising a heat exchanger unit and a frame, which supports said heat exchanger unit and comprises:
   two uprights fixed, in use, to respective struts of the motor vehicle;
   an upper horizontal crosspiece; and
   two connection elements, which connect said uprights to lateral ends of said upper horizontal crosspiece and are plastically deformable so as to allow said upper horizontal crosspiece to be lowered in the event of collision with a pedestrian;
   wherein said upper horizontal crosspiece comprises:
   a rear portion, which is relatively rigid and is fixed, at the lateral ends thereof, to said connection elements; and
   a front portion, which is plastically deformable, covers said rear portion and supports, in use, a bumper of the motor vehicle, and
   wherein said front portion defines an additional body fixed to said rear portion.

4. A motor vehicle front end according to claim 3, wherein said additional body is made of plastic material and said rear portion is made of metal material.

5. A motor vehicle front end comprising a heat exchanger unit and a frame, which supports said heat exchanger unit and comprises:
   two uprights fixed, in use, to respective struts of the motor vehicle;
   an upper horizontal crosspiece; and
   two connection elements, which connect said uprights to lateral ends of said upper horizontal crosspiece and are plastically deformable so as to allow said upper horizontal crosspiece to be lowered in the event of collision with a pedestrian;
   wherein said upper horizontal crosspiece comprises:
   a rear portion, which is relatively rigid and is fixed, at the lateral ends thereof, to said connection elements; and
   a front portion, which is plastically deformable, covers said rear portion and supports, in use, a bumper of the motor vehicle, and wherein said connection elements define a virtual hinge about a horizontal axis arranged beneath said upper horizontal crosspiece.

6. A motor vehicle front end according to claim 5, wherein said connection elements comprise respective front areas and respective rear areas; said front areas having less vertical compression strength than that of said rear areas so as to define said virtual hinge.

7. A motor vehicle front end according to claim 6, wherein, on each side of said upper horizontal crosspiece, said rear and front areas form part of a substantially vertical flat plate.

8. A motor vehicle front end according to claim 7, wherein said connection elements comprise respective vertical walls, which are transversal to said flat plates and are absent or made with reduced dimensions at said rear areas.

9. A motor vehicle front end according to claim 6, wherein said connection elements have respective passages made parallel to the virtual hinge axis between said front and rear areas.

* * * * *